W. H. DRIGGS, DEC'D.
M. E. DRIGGS, ADMINISTRATRIX.
SEMI-AUTOMATIC GUN.
APPLICATION FILED NOV. 13, 1907. RENEWED MAR. 26, 1913.
1,076,875.
Patented Oct. 28, 1913.
7 SHEETS—SHEET 3.
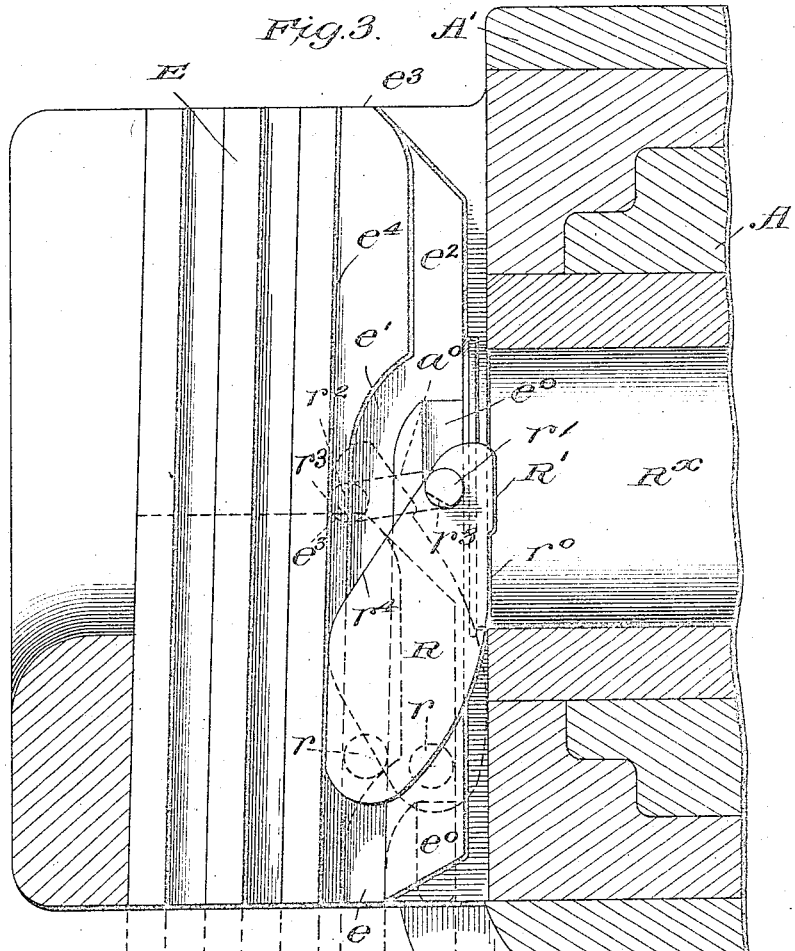
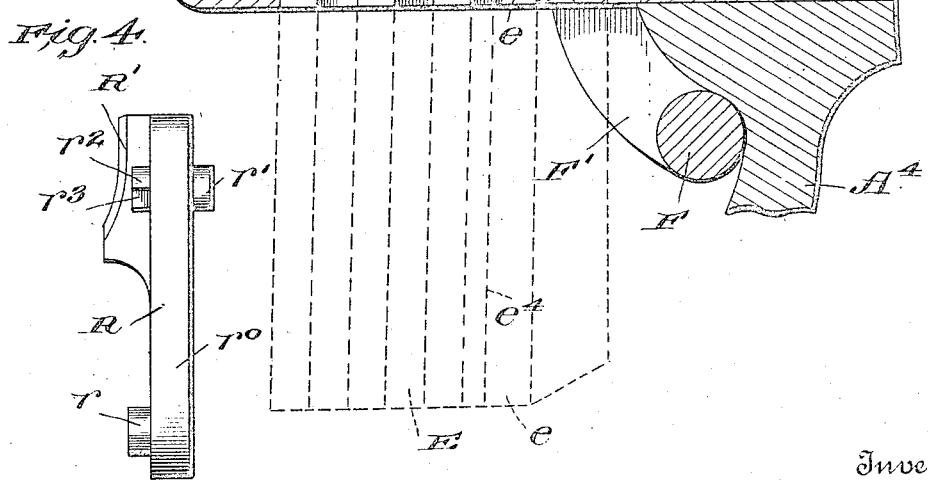

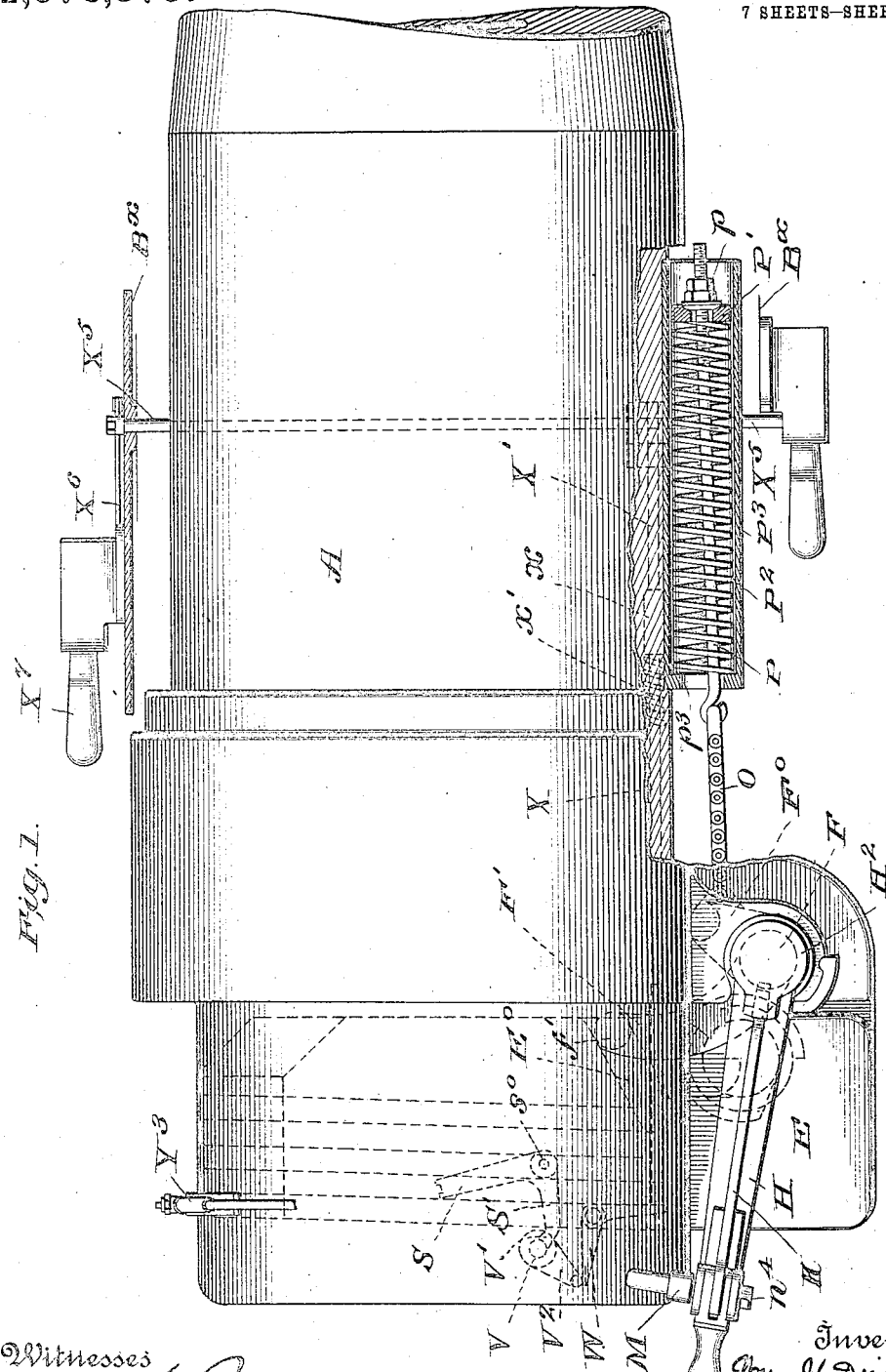

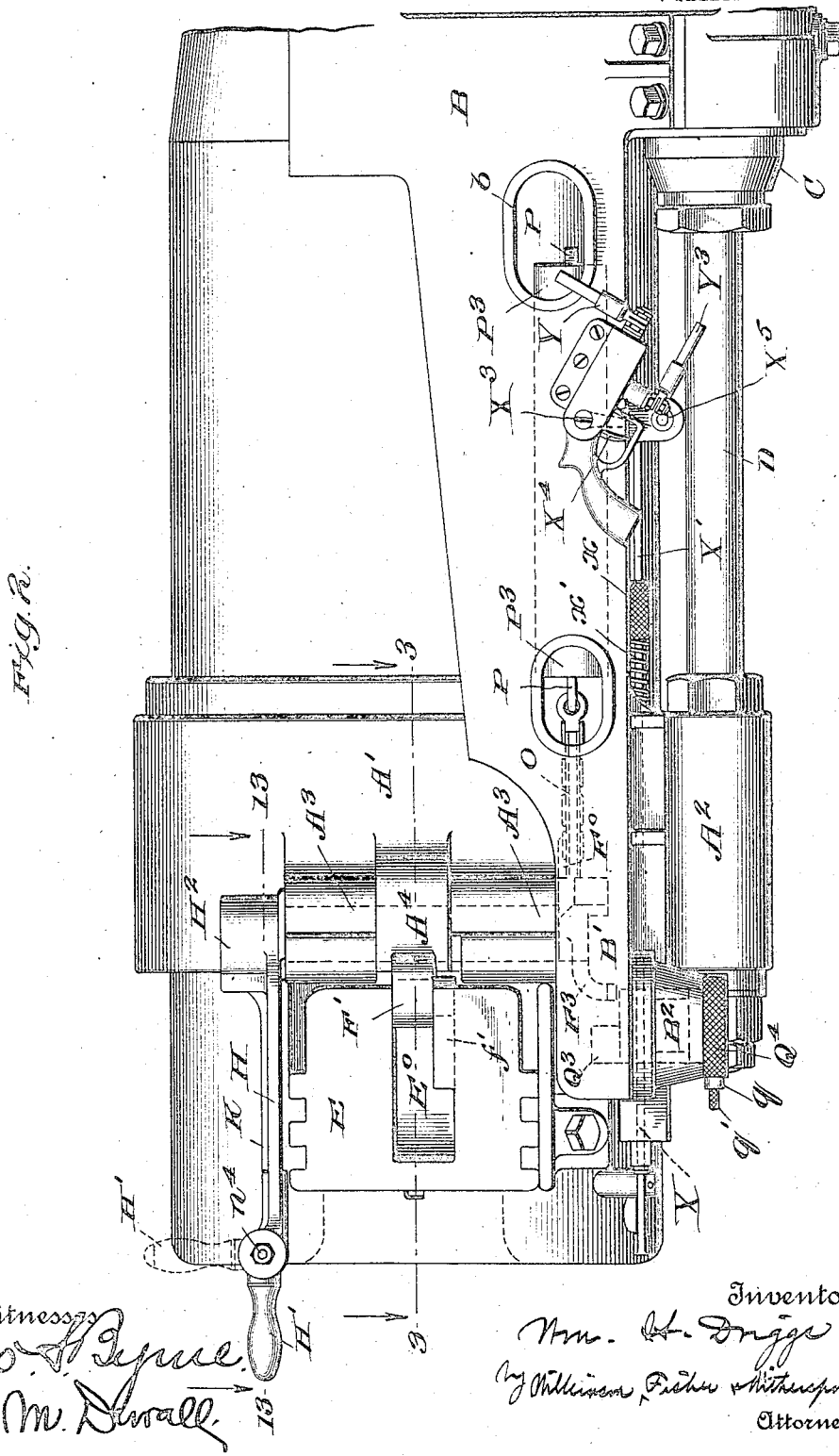

W. H. DRIGGS, DEC'D.
M. E. DRIGGS, ADMINISTRATRIX.
SEMI-AUTOMATIC GUN.
APPLICATION FILED NOV. 13, 1907. RENEWED MAR. 26, 1913.
1,076,875.
Patented Oct. 28, 1913.
7 SHEETS—SHEET 4.
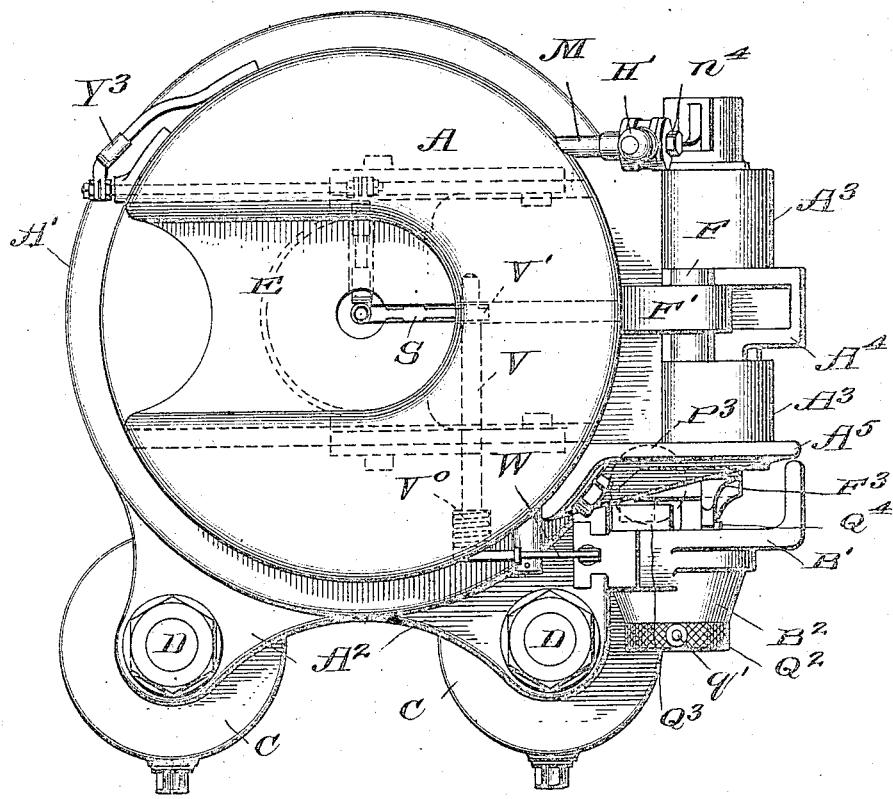
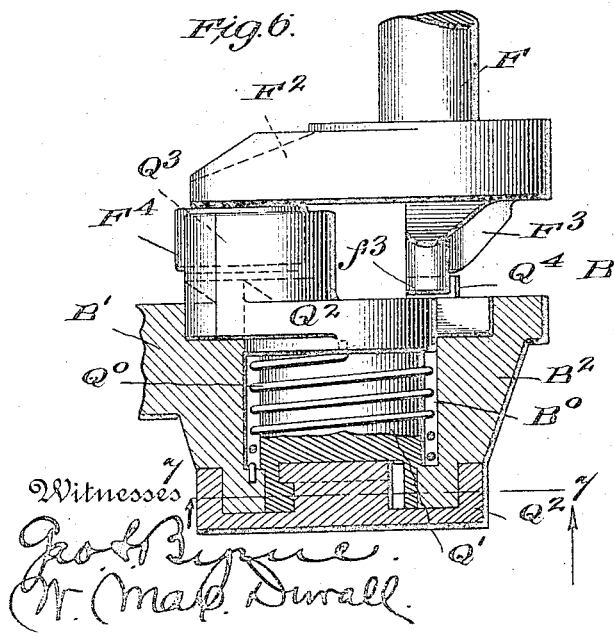
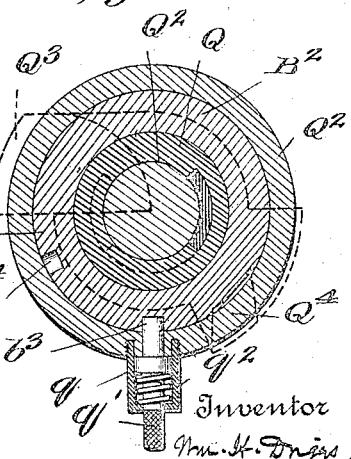

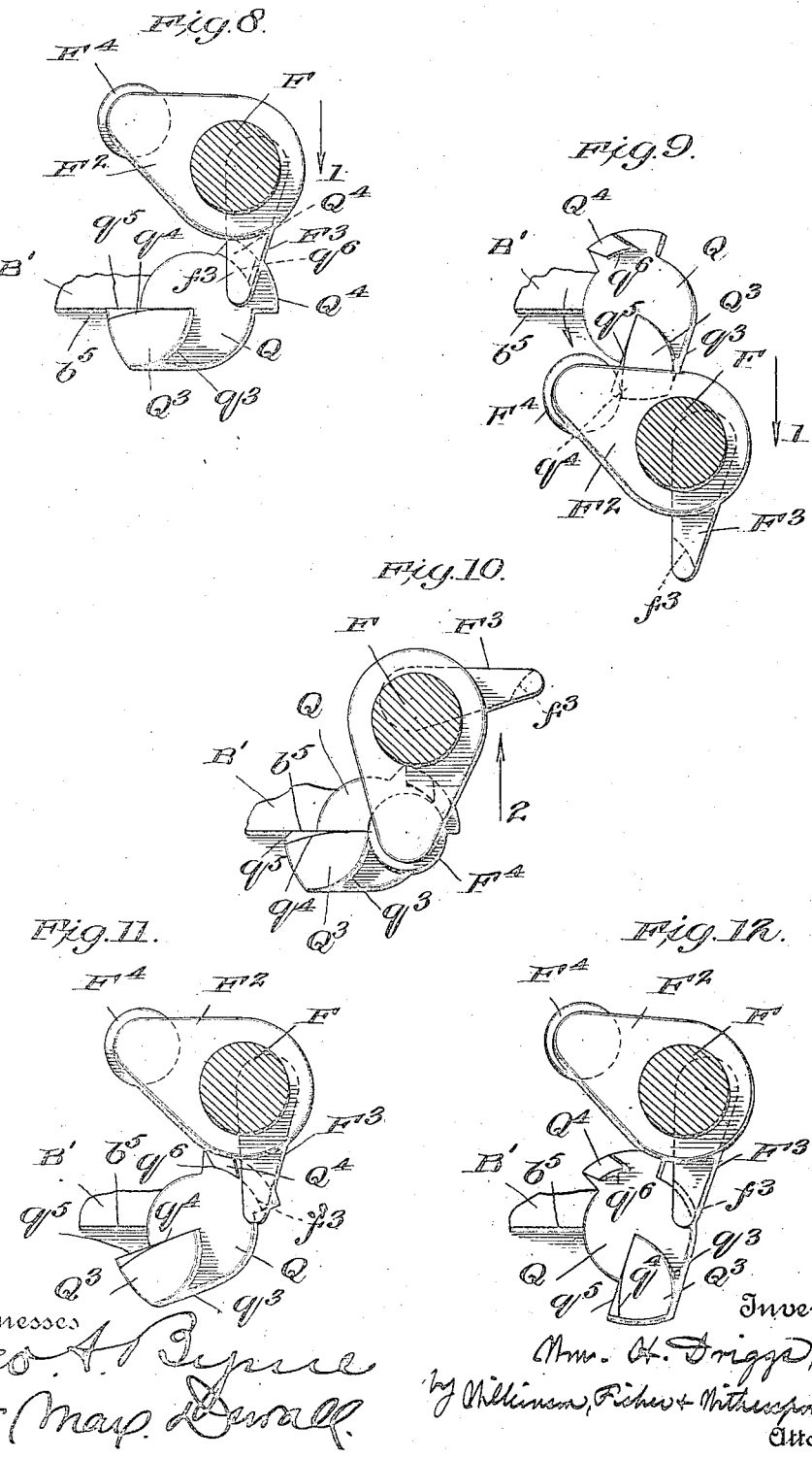

W. H. DRIGGS, DEC'D.
M. E. DRIGGS, ADMINISTRATRIX.
SEMI-AUTOMATIC GUN.
APPLICATION FILED NOV. 13, 1907. RENEWED MAR. 26, 1913.
1,076,875.
Patented Oct. 28, 1913.
7 SHEETS—SHEET 6.
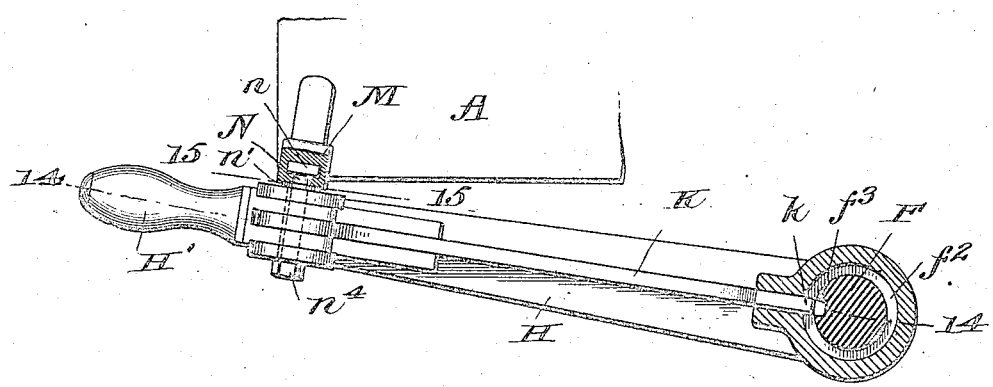
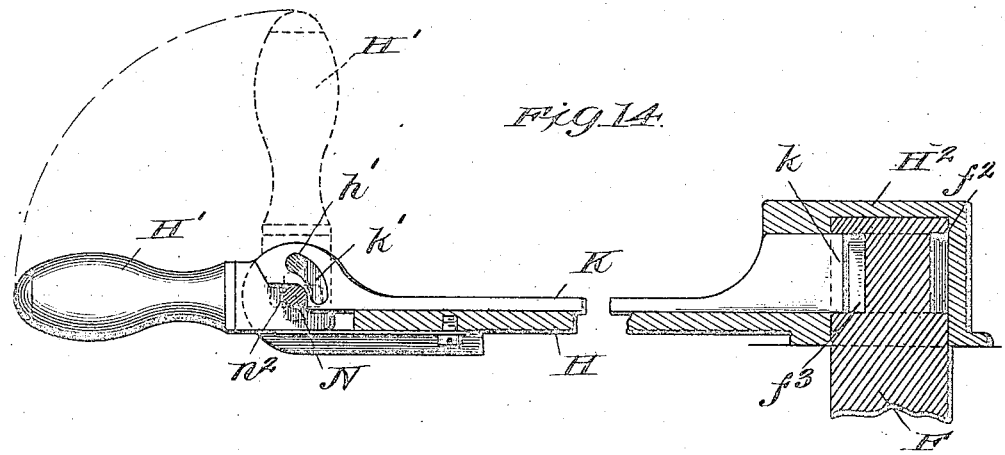
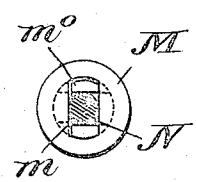
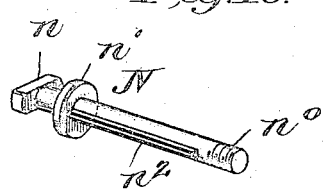

W. H. DRIGGS, DEC'D.
M. E. DRIGGS, ADMINISTRATRIX.
SEMI-AUTOMATIC GUN.
APPLICATION FILED NOV. 13, 1907. RENEWED MAR. 26, 1913.
1,076,875.
Patented Oct. 28, 1913.
7 SHEETS—SHEET 7.
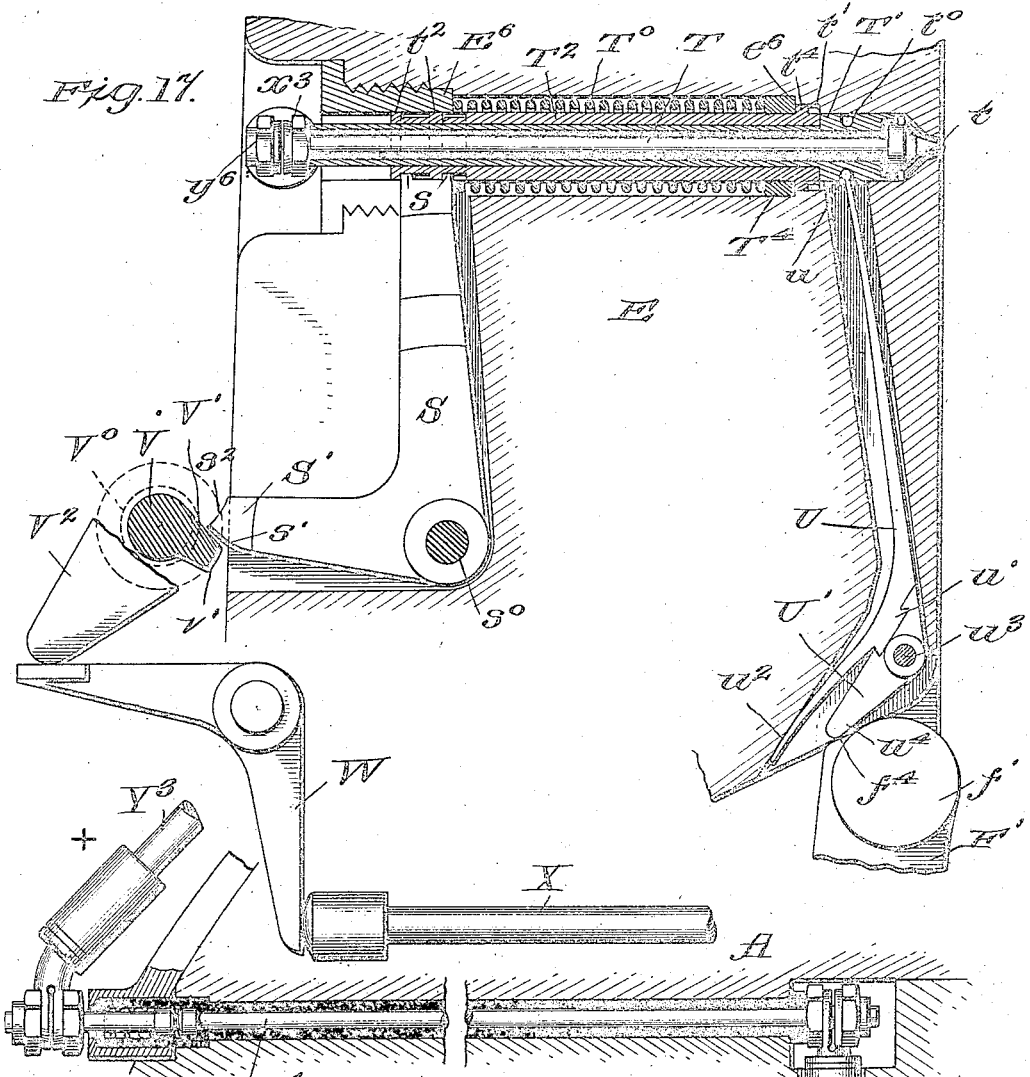
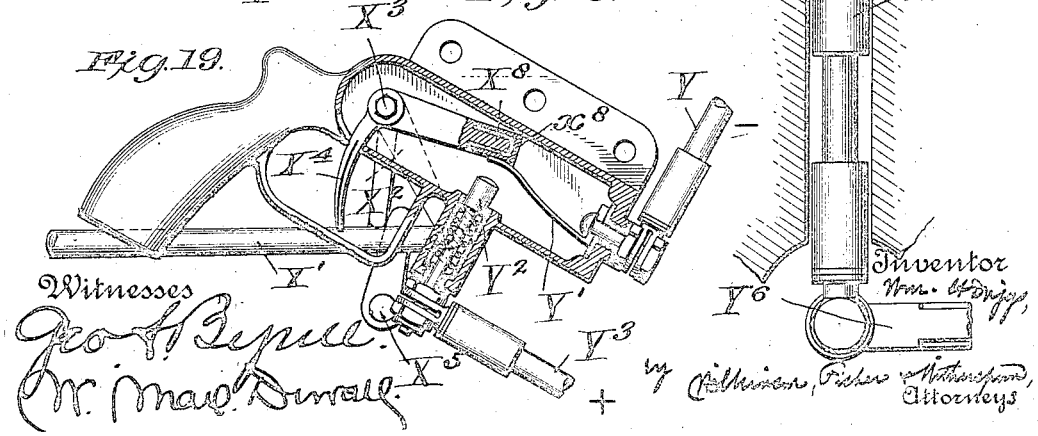

UNITED STATES PATENT OFFICE.

WILLIAM H. DRIGGS, OF WASHINGTON, DISTRICT OF COLUMBIA; MARY EDDY DRIGGS ADMINISTRATRIX OF SAID WILLIAM HALE DRIGGS, DECEASED.

SEMI-AUTOMATIC GUN.

1,076,875.  Specification of Letters Patent.  Patented Oct. 28, 1913.

Application filed November 13, 1907, Serial No. 402,036. Renewed March 26, 1913. Serial No. 757,043.

*To all whom it may concern:*

Be it known that I, WILLIAM H. DRIGGS, a citizen of the United States, residing at Washington, in the District of Columbia, have invented certain new and useful Improvements in Semi-Automatic Guns; and I do hereby declare the following to be a full, clear, and exact description of the invention, such as will enable others skilled in the art to which it appertains to make and use the same.

My present invention relates to the improvements in semi-automatic guns, in which a reciprocating breech block is used, and is more especially intended for guns of such a caliber as to render the ordinary lifting of the breech block objectionable, and in which a horizontal sliding breech block is used. Various features of the invention, however, apply equally well to breech blocks having a vertical motion, as well as to breech blocks having a horizontal motion, and unless particularly specified in claims, I intend the invention to apply to any of the well known types of guns now in use, to which said invention may be applicable.

My invention will be understood by reference to the accompanying drawings, in which the same parts are indicated by the same letters and numerals throughout the several views.

Figure 1 shows a plan view of the breech end of the gun, showing my invention applied thereto, parts being broken away, and parts being shown in section. Fig. 2 is a side elevation of the device shown in Fig. 1, as seen from the right of said figure. Fig. 3 shows a horizontal central section through the breech of the gun, on a larger scale than is shown in the previous figures, the breech block being shown in plan and the cartridge case being shown in the powder chamber. Fig. 4 is a detail showing the extractor, as seen from the rear. Fig. 5 is a rear elevation of the breech of the gun, parts of the mount being omitted. Fig. 6 is a detail showing the engagement of the cams for operating the gun semi-automatically. Fig. 7 is a section along the lines 7 7 of Fig. 6, but looking in the direction of the arrows. Fig. 8 shows diagrammatically the position of the cam arrangement when the breech is closed and the mechanism locked. Fig. 9 is a similar view to Fig. 8, but shows the cam arrangement when the recoil is not quite complete. Fig. 10 shows the cam arrangement on counter recoil with the breech open and the counter recoil not quite complete. Fig. 11 shows the cam arrangement with the cam released just before locking. Fig. 12 shows the cam locked out of engagement, the parts being then in position for operating the breech block by hand. Fig. 13 is a plan view, partly in section, of the hand lever, and illustrates the means of attaching same to the rock shaft and to the gun. Fig. 14 shows a section along the line 14 14 of Fig. 13, and looking in the direction of the arrows. Fig. 15 shows a section along the line 15 15 of Fig. 13 and looking in the direction of the arrows. Fig. 16 is a detail showing the pin for locking the hand lever to the gun. Fig. 17 shows a horizontal section through the breech block and illustrates the operation of the firing mechanism. Fig. 18 shows a vertical section through the walls of the gun, and through the breech block, and illustrates the means for connecting the electric conductors to the firing mechanism. Fig. 19 shows a section through the trigger box, parts being shown in elevation.

A represents the gun body having the usual reinforcing band A' over the powder chamber. This band is provided with the usual lugs $A^2$ for the piston rods of the recoil cylinders, and with lugs $A^3$ for the main bolt or rock shaft for moving the breech block, and with the lug $A^4$, see Fig. 5, to receive the operating arm on the rock shaft.

A part, B, of the cradle, is shown, which projects rearward, as shown at B', and is provided with a housing $B^2$ for the cam arrangement, as will be hereinafter described. The cradle carries one or more recoil cylinders, C, of the usual type, having piston rods D secured to the lugs $A^2$ in the usual way.

E represents the breech block, which is provided with an L shaped slot, $E^0$, adapted to receive the arm F' and lug $f'$ projecting therefrom, as shown in Figs. 1 and 2. This arm is rigidly attached to, or preferably integral with, the rock shaft F, which is journaled in the lugs $A^3$ at the side of the gun body. By having the arm F' flat on top where it engages in the upper wall of the slot $E^0$ in the breech block, it affords a large bearing surface to take part of the weight of the breech block in the process of moving the same into and out of its chamber, while the small lug $f'$ which effects the camming operation, presents small friction surfaces, thus facilitating the operation of the device.

The rock shaft F may be rocked in by hand, or by the semi-automatic attachment, as will be hereinafter described.

The hand operating devices comprise a lever H (see Figs. 1, 2, 13 and 14) which is loosely mounted over the upper end of the rock shaft F, which end is provided with an annular groove $f^2$, as shown in Fig. 14. One side of this groove, a notch $f^3$ is provided, into which the feather $k$ of the feather piece K is caused to engage, and the handle H′ is sprung up to the position indicated in dotted lines in Fig. 14. The rear end of this feather piece is provided with a cam groove $k'$ engaging the pin $h'$ on the handle H′.

When the handle is thrown down to the lower position indicated in full lines in Figs. 13 and 14, the feather K is withdrawn and the rock shaft F is free to rotate under the action of the semi-automatic gear, as will be hereinafter described. When the hand lever is thus in the disengaged position, I preferably provide a pin N shown in detail in Figs. 15 and 16, which has a head $n$ engaging beneath the shoulders $m$ of the block M fast to the gun shown in Fig. 13; thus forming a bayonet joint. This block is provided with an elongated slot $m^0$, as shown in Fig. 15, and the pin N is provided with a flange $n'$ engaging one side of the hand lever and is locked at that side with the nut $n^4$, engaging the screw threads $n^0$, see Figs. 13 and 16. The pin is provided with a feather $n^2$, which engages a corresponding groove in the handle H′, see Fig. 14, so that when the handle H′ is thrown up to the position indicated in dotted lines in Figs. 2 and 14, the head $n$ of the pin N will clear the slot $n^0$, so that when the feather piece is moved to the engaging position, the hand lever may be swung away from the gun body, and thus the breech mechanism may be operated by hand.

The semi-automatic gear comprises the short arm $F^0$ projecting from the rock shaft F, to which is connected the chain O fast to the rod P, which passes through elongated slot $p^3$ in the open ended cylinder $P^3$, which is secured to the gun body. Mounted on this rod P is a collar P′ held in place by washer and lock nuts. The spring $P^2$ is held under compression between this collar P′ and the other end of the cylindrical casing and the tension on the spring may be adjusted by screwing up on these lock nuts.

The casing $P^3$, carrying the spring $P^2$, rod P and chain O, may be moved from the gun by a single operation, and for this purpose, the casing is preferably detachably connected to the gun body in any convenient way, as by a dovetailed groove and tongue arrangement. As the gun recoils, the tension of the spring will always be sufficient to return the breech block to the closed position, when it is released by tripping the extractor, as will be hereinafter described.

Before describing the semi-automatic cam arrangement, it will make the operation clearer if we first describe the operation of the extractors.

One of the extractors is shown in plan in Fig. 3, and in rear elevation in Fig. 4; the other is similar, but having the parts reversely disposed.

The breech block E shown in plan in Fig. 3, is provided with a straight groove $e$ in its upper face, which is joined by the curved groove $e'$, to the straight groove $e^2$; beyond and in rear of this groove $e^2$ is a shoulder $e^3$ on the breech block. The breech block also has a straight groove $e^0$ on its upper face.

The extractor R consists of a flat plate of metal, having an inwardly projecting claw or rib R′, to engage the rim of the cartridge case. It has also, on its heel, an inwardly projecting cylindrical lug $r$ adapted to engage in the grooves $e$, $e'$, and $e^2$ of the breech block; and also a similar cylindrical lug $r'$ opposite the claw, to engage in a straight groove $a^0$ in the inner wall of the breech block chamber of the gun, indicated in dotted lines in Fig. 3. Opposite the lug $r'$ is a similar lug $r^2$, cut away as at $r^3$, to provide a flat engaging face. This lug $r^2$, projects into the groove $e^0$ when the breech is closed, and passes freely up the groove $e^2$ when the breech block is moved for opening or closing; but the face $r^3$ engages the shoulder $e^3$ when the breech is open, and holds the breech block in the open position until the extractor is tripped.

The front face of the extractor plate is curved as at $r^0$ to roll along the front face of the breech block chamber, while the rear face $r^4$ of the extractor plate is preferably flat to slide along the straight edge of the rib $e^4$ on the breech block when the extractor is swung to its rearward position.

The operation of the extractor is as follows: Suppose the breech to be closed, and the empty cartridge case $R^x$ to be in the gun, the parts being in the position shown in Fig. 3, and the breech block to be moved for opening the breech. The breech block will have quite a little lateral movement, and will have acquired considerable momentum before the cam groove $e'$ will engage the lug $r$, the said lug having meantime passed freely along the straight groove $e$; a powerful camming action is secured, not only due to the inertia of the breech block, supplemented by the power directly applied to opening the same, but also due to the powerful leverage on the extractor, which starts with a slow motion to the claw, effected at a long leverage, which motion is rapidly accelerated as the leverage shortens, due to the rolling of the extractor along its front face. The result is a slow prying out motion at the start, and a rapid ejecting motion at the end of the movement of the extractor. The straight groove $a^0$ in the gun engaging the lug $r'$ on the extractor, causes the claw to move backward in a straight line, thus holding it in close engagement with the rim of the cartridge case until the latter is ejected. As the extractor rolls about its front face, the lug $r^2$ is moved backward until it passes above the shoulder $c^3$ on the breech block, and clear of the same. The breech mechanism is preferably so adjusted that there is a slight overthrow of the operating arm F, causing the breech block to move slightly toward the closing position at the end of the travel of said arm, for reasons well known in the art. The result of this motion of the breech block is to cause its shoulder $e^3$ to engage the face $r^3$ of the extractor, thus locking the breech block against further closure, as indicated in dotted lines in Fig. 3. If now the extractor be tripped, as by the insertion of a fresh cartridge case, or by hand, the breech block can be closed either by the semi-automatic gear, or by hand.

The mechanism for controlling the action of the semi-automatic gear, and for throwing it into and out of operation will now be described.

On the opposite end of the shaft F from the hand lever H, there are two arms, $F^2$ and $F^3$, the former of which is preferably provided with an anti-friction roller $F^4$. The locking arm $F^3$ is provided with a curved shoulder $f^3$ shown in dotted lines in Figs. 8 to 12.

Q represents the cam block, which is provided with a cylindrical stem $Q'$ revolubly mounted in the socket $B^0$ of the boss $B^2$ carried by the cradle, and normally held against rotation in one direction by the coil spring $Q^0$, see Fig. 6. The cam block is held in place in the housing by the cap $Q^2$, which is mounted on the boss $B^2$, and engages the cam block after the manner of a bayonet joint, as shown in Figs. 6 and 7. Thus, the cap is locked to the cam block, and the latter is locked against being removed from the housing, but at the same time, is free to rock through an angle in one direction.

The cam block Q and the cap $Q^2$ may be held in either of two positions by means of the spring latch $q$, which projects into one of two recesses, $b^3$, $b^4$, in the hollow boss $B^2$, as shown in Fig. 7. The cap $Q^2$ is provided with a knurled or roughened rim, as shown in Fig. 5, and the spring catch $q$ provided with a hand lug $q'$, see Fig. 7, for convenience of manipulation. The inner end of the cam block Q is provided with a cam $Q^3$ having the cam faces $q^3$, $q^4$, and the shoulder $q^5$. On the opposite side of the cam block from the cam $Q^3$ in the locking lug $Q^4$ having a curved locking face $q^6$. The engagement of the roller $F^4$ with the cam $Q^3$ rocks the shaft F on counter recoil; and the coaction of the cam block and of said roller with the locking arrangement will be understood in reference to Figs. 6 to 12.

In Figs. 8 to 11, the series of steps during the complete cycle is illustrated, such parts as are not necessary to illustrate this coaction being omitted for the sake of clearness in the drawings. Fig. 8 shows the rock shaft F, and the cam Q in the normal position; that is, with the breech closed, and with the mechanism locked. In this position, the cam block is swung by the spring $Q^0$, see Fig. 6, so that the shoulder $q^5$ brings up against shoulder $b^5$ on the part $B'$ carried by the cradle. In this position, the cam block cannot be rotated in a direction opposite to that indicated by the arrow. In this position of the cam block, the holding face $f^3$ of the locking arm $F^3$ engages the face $q^6$ of the locking lug $Q^4$, and the rock shaft is held against turning for opening the breech. Now, if the gun recoils in the direction of the arrow, the roller $F^4$ will strike the cam face $q^4$ of the cam $Q^3$ and will press said cam back, rocking the cam block to the position shown in Fig. 9. After the roller passes clear of the cam face $q^4$, the spring $Q^0$ will snap the cam back to the initial position shown in Figs. 8 and 10, and as the gun goes forward on counter recoil, the roller $F^4$ will strike the cam face $q^3$, rocking the shaft F as indicated in Fig. 10, and opening the breech. After the breech is opened, the breech block will be held in the open position by the extractor, as hereinbefore described, the cam remaining in the position shown in Fig. 10; but when the extractor is tripped, releasing the breech block, the latter will swing up under the action of the spring $P^2$, which will cause the locking arm $F^3$ to rock the holding lug $Q^4$ up until the curved holding face $f^3$ passes under the curved face $q^6$, just after the position shown in Fig. 11 is assumed, at which time the spiral spring $Q^0$ will snap the cam back to the initial position shown in Fig. 8. Thus, it will be seen that the cam yields on recoil, and operates the rock shaft on counter-recoil, and that the locking attachment is cleared during the first part of the recoil, and is automatically put into engagement again when the breech is closed.

In order to throw the cam arrangement entirely out of operation, it will only be necessary to swing the cam block to the position shown in Fig. 12, when the cam is thrown out of action entirely, and the gun may be operated by hand. This position of the cam block is effected by turning the cap Q² until the spring latch $q$ engages in the notch $b^4$. Thus, there are two positions for the cam block; one in which the cam is set for semi-automatic firing, and the other in which the cam block is set for hand operation of the gun only.

The gun is provided with suitable firing mechanism, preferably adapted for use either for mechanical or electric firing.

The preferred form of firing mechanism is that shown in detail, Figs. 17 and 18, and in plan in Fig. 1, and will now be described:

Referring more especially to Figs. 17 and 18, S represents the sear in the form of a bell crank lever, horizontally disposed in the breech block, which sear is pivoted at $s^0$, has its head $s$ provided with a plurality of ribs to engage the firing pin, and has a cocking arm S′ rounded at $s'$ and curved at $s^2$ to engage the cocking toe, as will be hereinafter described.

T represents the firing pin, which is mounted in insulating material, inclosed in the cylinder T′, whose head is provided with an annular groove $t^0$. This cylinder T′ is mounted in another hollow cylinder T² having annular ribs $t^2$ to engage the head $s$ of the sear S. This cylinder T² is mounted to slide on the cylinder T′, and abuts against the shoulder $t''$ on the head of the said cylinder T′. Cylinder T² is provided with an annular rib $t^4$ adapted to engage the ring T⁴, which ring is normally pressed by means of the spring T⁰ against the shoulder $e^6$ in the breech block. The other end of the said spring abuts against a bushing E⁶, which is slotted at one side to admit the passage of the head of the sear, as shown in Fig. 17. The point $t$ of the firing pin passes through the usual opening in the breech block.

U represents a spring whose end $u$ engages in the annular groove $t^0$ of the cylinder T′; and the other end of this spring $u^2$ bears against a face on the breech block. This spring is dove-tailed as at $u'$ to the block U′, which is pivoted at $u^3$ to the breech block, and has an arm $u^4$ engaging face $f^4$ on the head of the operating arm F′. This spring normally holds the point of the firing pin masked within the breech block, but the last part of the motion of the operating arm in closing the breech causes the shoulder $f^4$ on said arm to press on the arm U′, causing the point $u$ of the spring to gently press the head of the firing pin through the opening in the face of the breech block and against the primer, when the gun may be fired by electricity, as will be hereinafter described.

For mechanical firing, I provide a cocking toe V′ on the shaft V, which toe has a rounded face $v'$ adapted to engage the rounded face $s^2$ of the cocking arm S′. This shaft is normally held in the position shown in Fig. 17 by a coil spring V⁰, and the cocking toe yields as the breech block is moved to the opening position, but cocks the sear as the breech block is moved to close the breech. The shaft V carries an arm V² which engages with the bell crank lever W, see Fig. 17, against which presses the rod X. This rod is telescopically connected with the rod X′ by means of the junction sleeve $x$, see Fig. 2, which bears against the trigger spring $x'$, and the tension of the spring may be adjusted by means of this sleeve. The tendency of the return spring is to keep the two rods X and X′, with the arm X² on the shaft X³ carrying the trigger X⁴ normally in the initial position shown in Fig. 19. This shaft X³ also carries an arm X⁸ having an insulated conducting head $x^8$, which engages with the spring contact Y′, connected to the return conductor Y connected to the gun body. A spring contact piece Y² is provided near the trigger mechanism, which is connected with the conductor Y³, which leads to the conductors Y⁴, Y⁵, and Y⁶, connected to the firing pin. So that the gun may be fired from either side, I arrange a transverse rod X⁵ and lever X⁶ connected to a trigger mechanism X⁷ on the other side of the gun, so that the shaft X³ may be rocked from either side of the gun by pulling on one of the triggers.

It will be noted from an inspection of Fig. 19, that the first movement of the trigger X⁴ will be to cause the spring contact Y′ to connect with the contact Y², which will provide for electric firing, if the electric current is on; the further movement of the trigger will cause the rod X′ to first compress the spring $x$ and then to move the rod X, rocking the bell crank lever W, and causing the arm V² to trip the cocking toe $v'$ and release the sear.

Releasing the sear will allow the spring T⁰ to drive the ring T⁴ and with it the cylinder T² forward until the said ring T⁴ brings up against the shoulder $e^6$, when the further forward movement of the ring will be arrested; but the inertia of the cylinder T² will cause it to fly forward, striking the shoulder $t'$ and giving a blow to the firing pin which is already in contact with the primer.

The spring U will return the firing pin to the masked position, when the breech is opened.

It will be obvious that various modifications might be made in the hereindescribed apparatus, which could be used without departing from the spirit of my invention.

Having thus described the invention, what I claim and desire to secure by Letters Patent of the United States is:

1. In a semi-automatic gun, the combination with a horizontal sliding breech block, of a vertical main bolt pivotally mounted at one side of the gun body, an operating arm carried by said bolt and engaging in a recess in the breech block, a hand lever mounted at the upper end of the said main bolt, means for locking said hand lever to said main bolt, and releasing it therefrom when desired, an arm carried by the lower end of said main bolt, a cam arrangement carried by the cradle and adapted to engage said arm on counter recoil, means for locking said cam arrangement out of engagement with said arm when desired, and means for exerting spring pressure on said main bolt, tending to normally rock the same to the position for closing the breech, substantially as described.

2. In a semi-automatic gun, the combination with a sliding breech block, of a main bolt pivotally mounted on the gun body, an operating arm carried by said bolt and engaging the breech block, a hand lever carrying a pivoted handle and loosely mounted on said main bolt, means for locking said handle to the gun body, and operated by lifting said pivoted handle to release the hand lever from the gun body, means for simultaneously locking the lever to the main bolt, an arm on said main bolt, a cam arrangement carried by the cradle and adapted to engage said arm on counter recoil, and means for exerting spring pressure on said main bolt, tending to normally rock the same to the position for closing the gun, substantially as described.

3. In a semi-automatic gun, the combination with a sliding breech block, of a main bolt pivotally mounted on the gun body, an operating arm carried by said bolt and engaging the breech block, a hand lever carrying a pivoted handle and loosely mounted on said main bolt, means for locking said handle to the gun body, and operated by lifting said pivoted handle to release the hand lever from the gun body, means for simultaneously locking the lever to the main bolt, an arm on said main bolt, a cam arrangement carried by the cradle and adapted to engage said arm on counter recoil, means for locking said cam arrangement out by engagement with said arm when desired, and means for exerting spring pressure on said main bolt, tending to normally rock the same to the position for closing the gun, substantially as described.

4. In a semi-automatic gun, the combination with a sliding breech block, of a main bolt pivotally mounted on the gun body, an operating arm carried by said bolt and engaging in a recess in the breech block, a hand lever loosely mounted on said main bolt, a handle pivoted on said hand lever, means for locking said hand lever to the gun body, and operated by swinging said handle about its pivot for releasing the hand lever from the gun body, and independent means also operated by swinging said handle about its pivot for locking the hand lever to the main bolt, substantially as described.

5. In a semi-automatic gun, the combination with a sliding breech block, of a main bolt pivotally mounted on the gun body, an operating arm carried by said bolt and engaging in a recess in the breech block, a hand lever loosely mounted on said main bolt, a handle pivoted on said hand lever, means for locking said hand lever to the gun body, and operated by swinging said handle about its pivot for releasing the hand lever from the gun body, and independent means also operated by swinging said handle about its pivot for locking the hand lever to the main bolt, a cam arrangement carried by the cradle and adapted to engage said arm on counter recoil, and means for exerting spring pressure on said main bolt, tending to normally rock the same to the position for closing the gun, substantially as described.

6. In a semi-automatic gun, the combination with a sliding breech block, of a main bolt pivotally mounted on the gun body, an operating arm carried by said bolt and engaging in a recess in the breech block, a hand lever loosely mounted on said main bolt, a handle pivoted on said hand lever, means for locking said hand lever to the gun body, and operated by swinging said handle about its pivot for releasing the hand lever from the gun body, and independent means also operated by swinging said handle about its pivot for locking the hand lever to the main bolt, a cam arrangement carried by the cradle and adapted to engage said arm on counter recoil, means for locking said cam arrangement out of engagement with said arm when desired, and means for exerting spring pressure on said main bolt, tending to normally rock the same to the position for closing the gun, substantially as described.

7. In a semi-automatic gun, the combination with a horizontal sliding breech block, of a vertical main bolt pivotally mounted at one side of the gun body, an operating arm carried by said bolt and engaging in a recess in the breech block, a hand lever mounted at the upper end of the said main bolt, means for locking said hand lever to said main bolt, and releasing it therefrom when desired, an arm carried by the lower end of said main bolt, a cam arrangement carried by the cradle and adapted to engage said arm on counter recoil, rolling extractors mounted between the breech block and the walls of the breech block chamber and adapted to hold the breech block clear of the bore and to release same when tripped, and means for exerting spring pressure on said main bolt, tending to normally rock the same to the position for closing the breech, substantially as described.

8. In a semi-automatic gun, the combination with a sliding breech block, of a main bolt pivotally mounted on the gun body, an operating arm carried by said bolt and engaging in a recess in the breech block, rolling extractors mounted between the breech block and the walls of the breech block chamber and adapted to hold the breech block clear of the bore and to release same when tripped, a hand lever loosely mounted on said main bolt, a handle pivoted on said hand lever, means for locking said hand lever to the gun body, and operated by swinging said handle about its pivot for releasing the hand lever from the gun body, and independent means also operated by swinging said handle about its pivot for locking the hand lever to the main bolt, substantially as described.

9. In a gun provided with a sliding breech block, the combination with the gun body provided with a breech block chamber with a substantially longitudinal groove in the wall of said chamber, of a breech block provided with a holding shoulder and a cam groove for the extractor, an extractor mounted between the breech block and said wall of said chamber, and having a curved front face adapted to roll along the front wall of said chamber, and provided with a claw, and with oppositely disposed lugs, one lug projecting into the cam groove in the breech block, and the other lug projecting into said groove in the gun body, whereby the claw of the extractor is caused to move in a straight line rearward with a slow prying out motion and with an accelerated ejecting motion, the said extractor being also provided with a third lug adapted to swing over and engage said holding shoulder on the breech block, and to release same when tripped, substantially as described.

10. In a gun provided with a sliding breech block, the combination with the gun body provided with a breech block chamber with a substantially longitudinal groove in the wall of said chamber, of a breech block provided with a holding shoulder and a cam groove for the extractor, an extractor mounted between the breech block and said wall of said chamber, and having a curved front face adapted to roll along the front wall of said chamber, and provided with a claw, and with oppositely disposed lugs, one lug projecting into the cam groove in the breech block, and the other lug projecting into said groove in the gun body, whereby the claw of the extractor is caused to move in a straight line rearward with a slow prying out motion and with an accelerated ejecting motion, the said extractor being also provided with a third lug flattened at one side, and adapted to swing over and engage said holding shoulder on the breech block, and to release same when tripped, substantially as described.

11. In a gun provided with a sliding breech block, the combination with the gun body provided with a breech block chamber with oppositely disposed and substantially longitudinal grooves in the walls of said chamber, of a breech block provided with oppositely disposed holding shoulders and cam grooves for the extractors, extractors mounted between the breech block and said walls of said chamber, and each having a curved front face adapted to roll along the front wall of said chamber, and also being provided with a claw, and with oppositely disposed lugs, one lug projecting into the cam groove in the breech block, and the other lug projecting into said groove in the gun body, whereby the claw of the extractor is caused to move in a straight line rearward with a slow and prying out motion and with an accelerated ejecting motion, each of the said extractors being also provided with a third lug adapted to swing over and engage said holding shoulder on the breech block, and to release same when tripped, substantially as described.

12. In a gun provided with a sliding breech block, the combination with the gun body provided with a breech block chamber with oppositely disposed and substantially longitudinal grooves in the walls of said chamber, of a breech block provided with oppositely disposed holding shoulders and cam grooves for the extractors, extractors mounted between the breech block and said walls of said chamber, and each having a front face adapted to roll along the front wall of said chamber, and also being provided with a claw, and with oppositely disposed lugs, one lug projecting into the cam groove in the breech block, and the other projecting into said groove in the gun body, whereby the claw of the extractor is caused to move in a straight line rearward with a slow prying out motion and with an accelerated ejecting motion, each of the said extractors being also provided with a third lug flattened at one side, and adapted to swing over and engage said holding shoulder on the breech block, and to release same when tripped, substantially as described.

In testimony whereof, I affix my signature, in presence of two witnesses.

WILLIAM H. DRIGGS.

Witnesses:
R. M. PARKER,
E. WILKINSON.

---

Copies of this patent may be obtained for five cents each, by addressing the "Commissioner of Patents, Washington, D. C."